United States Patent [19]

Campbell et al.

[11] Patent Number: 4,574,305

[45] Date of Patent: Mar. 4, 1986

[54] REMOTE HUB TELEVISION AND SECURITY SYSTEMS

[75] Inventors: John G. Campbell, Irving; Carl F. Schoeneberger, Carrollton, both of Tex.

[73] Assignee: Tocum, Incorporated, Irving, Tex.

[21] Appl. No.: 522,908

[22] Filed: Aug. 11, 1983

[51] Int. Cl.$^4$ .............................................. H04N 7/10
[52] U.S. Cl. .......................................... 358/86; 455/5; 179/5 R
[58] Field of Search ...................... 358/86, 114; 455/4, 455/5; 179/5 R

[56] References Cited

U.S. PATENT DOCUMENTS

| | | | |
|---|---|---|---|
| 3,898,374 | 8/1975 | Gargini . | |
| 3,990,012 | 11/1976 | Karnes | 325/308 |
| 3,996,578 | 12/1976 | Takeuchi et al. | 358/86 X |
| 4,057,829 | 11/1977 | Moorehead | 358/86 |
| 4,064,460 | 12/1977 | Gargini | 358/86 X |
| 4,302,771 | 11/1981 | Gargini | 358/86 |
| 4,361,730 | 11/1982 | Barber et al. | 455/5 X |
| 4,475,123 | 10/1984 | Dumbauld et al. | 358/86 X |
| 4,484,218 | 11/1984 | Boland et al. | 358/86 |
| 4,494,111 | 1/1985 | Rocci et al. | 358/86 X |
| 4,530,008 | 7/1985 | McVoy | 358/86 X |

FOREIGN PATENT DOCUMENTS

WO82/04170 11/1982 PCT Int'l Appl. .................... 358/86

OTHER PUBLICATIONS

Mesiya et al., "Mini-Hub Addressable Distribution System for Hi-Rise Application," *IEEE Conference: First Annual Phoenix Conference on Computers and Communications*, Phoenix, Az., May 9-12, 1982, pp. 346-351.

Gray et al., "A Multiservice System Using Fiber Optic Loops," *NTG-Fachber*, (Germany), vol. 73 (1980), pp. 119-124.

Clifford B. Schrock, "Proposal for a Hub Controlled Cable Television System Using Optical Fiber," *IEEE Transactions on Cable Television*, vol. CATV-4, No. 2, Apr. 1979, pp. 70-77.

*Primary Examiner*—Keith E. George
*Attorney, Agent, or Firm*—Hopgood, Calimafde, Kalil, Blaustein & Judlowe

[57] ABSTRACT

A data communications system provides for the transmission of television signals from a central station to a plurality of remote user stations and the transmission of security data from the user stations back to the central station. The downstream television signals and upstream security data are processed through a plurality of remote hub stations, each servicing several of the remote user terminal stations. The remote hub stations convert downstream television control data and programming signals for reception by the users serviced by that station. The remote hub station also receive security monitoring data transmitted from each user station and generate additional security data for the central station. In one embodiment, the remote hub processing station includes a plurality of converters, each transmitting downstream on a separate dedicated communication link to a remote user station. Each dedicated link also transmits security data upstream from the remote user station to the remote hub processing station. A logic unit at the remote hub station controls the operation of the converters and processes the upstream security data for transmission to the central station. In said embodiment, each user station includes a data separator unit connected to the dedicated communication link from the remote hub processing station for directing downstream television signals to the user's television receiver and directing upstream security data to the logic of the remote hub processing station. The security data is generated at each user station by a plurality of security monitoring devices each providing an alarm status signal to an arming control panel which generates the security data to be transmitted upstream. Another embodiment eliminates the converters at the remote hub processing station in favor of a plurality of splitters transmitting the television signals to the users. Transmission of the signals from the remote hub station to the user stations is carried out by using conventional RF, baseband or optic modulation techniques and may include conventional crosspoint switching techniques.

5 Claims, 6 Drawing Figures

REMOTE HUB TELEVISION AND SECURITY SYSTEMS

BACKGROUND OF THE INVENTION

The present invention concerns methods and apparatus for a data communications security system. More particularly the present invention is concerned with a data communication system having a security data processing station remote from both the central station and the local user stations.

There are a number of different data communication systems providing means for security control, that is apparatus for monitoring the status of various alarm devices and periodically providing data concerning the status of the devices to a central computer station. A typical security system includes a central station communicating with a number of remote user stations by coaxial cable. Typically, each user station includes several security monitoring devices such as a smoke detector and door and window switches. Additional emergency buttons may be included at the user station to summon police, firemen or medical assistance. These devices provide alarm signals to a home terminal which converts the signals to a format compatible for transmission over the coaxial cable to the central computer station. It is also common to combine such a security system with a cable television system.

One of the difficulties experienced with this conventional approach is the expense involved in providing a complete home terminal at each remote user station. Such a terminal normally includes an arming control station, a receiver-transmitter modem and substantial processing logic in order to process the alarm signals and transmit them in a format acceptable to the central computer station. The cost of purchasing, installing and maintaining such a home terminal system has been prohibitive for many otherwise potential subscribers.

In addition to the foregoing difficulty, the location of a complete security terminal at the location where security is being monitored increases the likelihood of disruption of the system by tampering. In fact, the potential for tampering by an intruder effectively defeats one purpose of the system in warning of intrusion and burglary. Moreover, the presence of a terminal at the remote user location offers an opportunity for a user to tamper with his own teminal in an attempt to change his level of service from that authorized by the central station. This is a particular problem where a cable security system is coupled with a subscription television system providing different levels of television service to the user.

SUMMARY OF THE INVENTION

The present invention is directed to a data communication system having a remote hub processing station located remote from both the central station and the local user stations. The remote hub station processes downstream television control data and programming signals for reception by users serviced by the station. The remote hub station also processes security monitoring data transmitted from each user station and, optionally, processes security control data transmitted from the central station. Thus, most of the television conversion and security arming and disarming activities are performed at a station remote from the user location.

In a preferred embodiment of the present invention, a remote hub processing station includes a video processor for converting the television signals for reception by the remote user stations, a security processor for receiving security signals from the remote user stations and generating security data for transmission to the central station, and a plurality of data communication links, each link interfacing between one of the remote user stations and the video processor and security processor. Each communications link may comprise a coaxial cable, a plurality of fiber optic lines or wireless transmission. The communication links are dedicated for the transmission of downstream television signals to the remote user stations and upstream security signals to the remote hub station from the user stations.

Said preferred embodiment further includes a plurality of adapter units each communicating with the remote hub processing station by one of the communication links. Each adapter unit is located at one of the remote user stations and has a security unit for generating security signals representative of the status of a plurality of security monitoring devices at the remote user station. A television receiver is also provided for processing television signals transmitted from the remote hub processing station on each communication link. Data separator means are provided in communication with each data communication link as well as with the security unit and television receiver. The communication links transmit the television signals to the television receiver and transmit security signals from the subscriber stations to the remote hub processing station.

In another preferred embodiment of the present invention, a remote hub processing station is provided in communication with and located remote from a central station and a plurality of user stations. The remote hub processing station includes a splitter for dividing the television signals into a plurality of signals, one for each of the remote user stations. A plurality of converters are also provided to tune each of the split television signals for reception by one of the remote user stations. A transceiver receives data from the central station associated with the television signals and with security control and transmits to the central station data associated with the remote user stations. A logic unit communicates with the transceiver, the plurality of converters and the remote user stations to generate tuning control data for controlling the converter means and to generate security data representative of the security status of each remote user station for transmission to the central station by way of the transceiver means. A plurality of adapters are also provided, one at each remote user station. Each adapter includes a frequency separator for separating the downstream television signals to the subscriber from the upstream security signals for the remote station. Each adapter unit also includes a plurality of security monitoring devices, each being capable of generating an alarm signal, and a security arming panel for generating security signals representative of the alarm signals to be transmitted to the remote processing station.

In another specific embodiment of the present invention, a remote hub has a first splitter for dividing incoming television signals into a plurality of television signals, one for each level of service provided to the remote user station. A plurality of second splitters are connected to the first splitter, each dividing its television signal input into a plurality of television signals for each remote user station entitled to a particular level of service. A plurality of frequency filters are positioned between the first splitter and the second splitters for providing to the second splitters only those television programs authorized for each particular level of service. A plurality of data communication links each extend to one of the remote user stations and are connected to a security logic unit by a common security data separator strip which removes the security signals from the communication links for processing by the security logic. A transmitter unit directs security data from the security logic to the central station.

Further included in the said embodiment are a plurality of adapters, each communicating with the remote hub processing station and being located at one of the remote user stations. Each adapter includes a data separator for separating the downstream user television signals from the security data signals transmitted on the communication link. A plurality of security monitoring devices each selectively generate an alarm signal representative of the status of the device. A security arming unit monitors these devices and generates security data signals which are transmitted on each communication link to the remote hub processing station.

The system of the present invention as described above and more fully described hereinafter has the advantage of processing television signals and security data at a location remote from each subscriber station. By centralizing such data processing, the apparatus required at each subscriber station is substantially reduced thereby resulting in a great savings to the subscriber. In addition, the cable operator is able to more closely monitor and control access to critical equipment used in processing television programming and security data so as to minimize the possibility of tampering and to improve accessibility for maintenance and repair.

The concept of the present invention is not necessarily limited to cable television but can be applied to other types of data communication systems having remote subscribers communicating with a central station with regard to television signals and security control. The mode of communication, whether by coaxial cable, fiber optic lines or wireless transmission is not critical. One of the important features of the present invention is the remote location of the television conversion apparatus and security processing apparatus remote from the subscriber. Another important aspect is the use of a common data link between the remote station and the subscriber for the transmission of both television program and control signals and security control and monitoring signals. Such transmission may be done at different frequencies or in different modes of transmission provided that the television and security transmissions are at sufficiently different frequencies to not interfere with each other in transmission along each dedicated communication link between the remote processing hub and each subscriber station.

BRIEF DESCRIPTION OF THE DRAWINGS

The novel features believed to be characterized of the invention are set forth in the appended claims. The preferred mode of the present invention, as well as future objects and advantages thereof, will best be understood by reference to the following detailed description of a preferred embodiment when read in conjunction with the accompanying drawings.

DETAILED DESCRIPTION OF THE DRAWINGS

Figure 1:
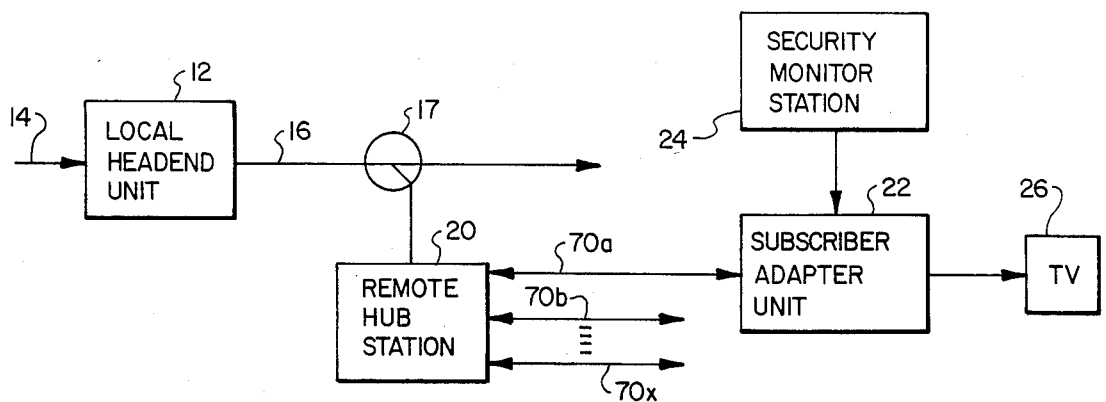
FIG. 1 is a block diagram of a preferred embodiment of the present invention disclosing that portion of a data communication system which is remote from the central station.

With reference now to FIG. 1, one preferred embodiment of the present invention is shown. In this embodiment, the data communication system processes both security-related data and television-related data over a coaxial cable at a remote hub station between a central station and a plurality of local user stations. The television data are downstream television program signals and addressing and control data processed by converter logic or hardwired apparatus at the remote hub. The security data are upstream monitoring data from the subscriber stations which are processed by security logic at the hub.

FIG. 1 shows the portion of a data communication system located remote from the central station including one of the remote subscriber stations. The local headend unit 12 receives television signals on input line 14 from the central computer station. This input is preferably by way of coaxial cable, but can also be transmitted by fiber optic data link or direct wireless transmission. In addition to television signals, the data preferably includes addressing and control signals for the local headend unit 12 and the plurality of subscribers addressed by that unit. The data is preferably transmitted to headend unit 12 at baseband level or on an RF carrier.

The function of the local headend unit is primarily to generate specific addressing data for use by a subscriber converter assembly. Local headend unit 12 may also be used to descramble certain television channels and to generate authorization codes with regard to the downstream subscribers.

In one preferred embodiment compatible with service to high density population, the conventional local headend unit 12 is installed at a service facility in an apartment complex where the downstream subscribers reside. Unit 12 is preferably conventional circuitry such as Central Data Security System, Model No. IV-A made by Tocom, Incorporated of Irving, Tex.

The output data from local headend unit 12 is transmitted on cable plant 16. This coaxial cable preferably feeds directly to a number of cable drops 17, each leading to a remote hub station 20. Each hub station 20 is located remote from a plurality of subscribers serviced by that station, preferably in a controlled access area at any distance from local headend unit 12. Each remote hub station 20 is connected to a subscriber adapter unit 22 which outputs to the subscriber's television receiver 26 and which receives input from a security monitor station 24.

One of the functions of station 20 is to convert the downstream television signals to frequencies compatible with the television receiver of the subscribers. This conversion process is controlled by downstream addressing and control data sent from the local headend unit 12, most of which originated from the central processing station, as well as upstream control data originating from each subscriber. Thus television program authorization is controlled at hub station 20 before being processed to the subscribers.

In addition to the conversion and control of television signals, remote hub station 20 also controls security functions for the subscribers communicating with the station. Each subscriber adapter unit 22 includes a security monitor station 24 providing input from a number of monitoring devices. Data concerning smoke detection, intrusion through doors or windows and signals for assistance from police, medical personnel and firemen are all generated from security monitor station 24 through subscriber adapter unit 22 to the remote hub station 20. Station 20 processes this data, compares it to encoding previously received from the subscriber and carries out the necessary security functions.

The system shown in FIG. 1 can be utilized in a conventional one-way television system wherein only downstream television signals are sent through the local headend unit 12 and along cable plant 16 to each remote hub station 20. In such a one-way system, if return signals concerning security status are to be sent to the central station, they may be transmitted by a telephone dialer unit connected directly to the central station by telephone line. Alternately, the system of FIG. 1 may be utilized in a two-way communication system wherein the security data is transmitted directly up the cable plant 16 through the local headend unit 12 to the central station.

Figure 2:
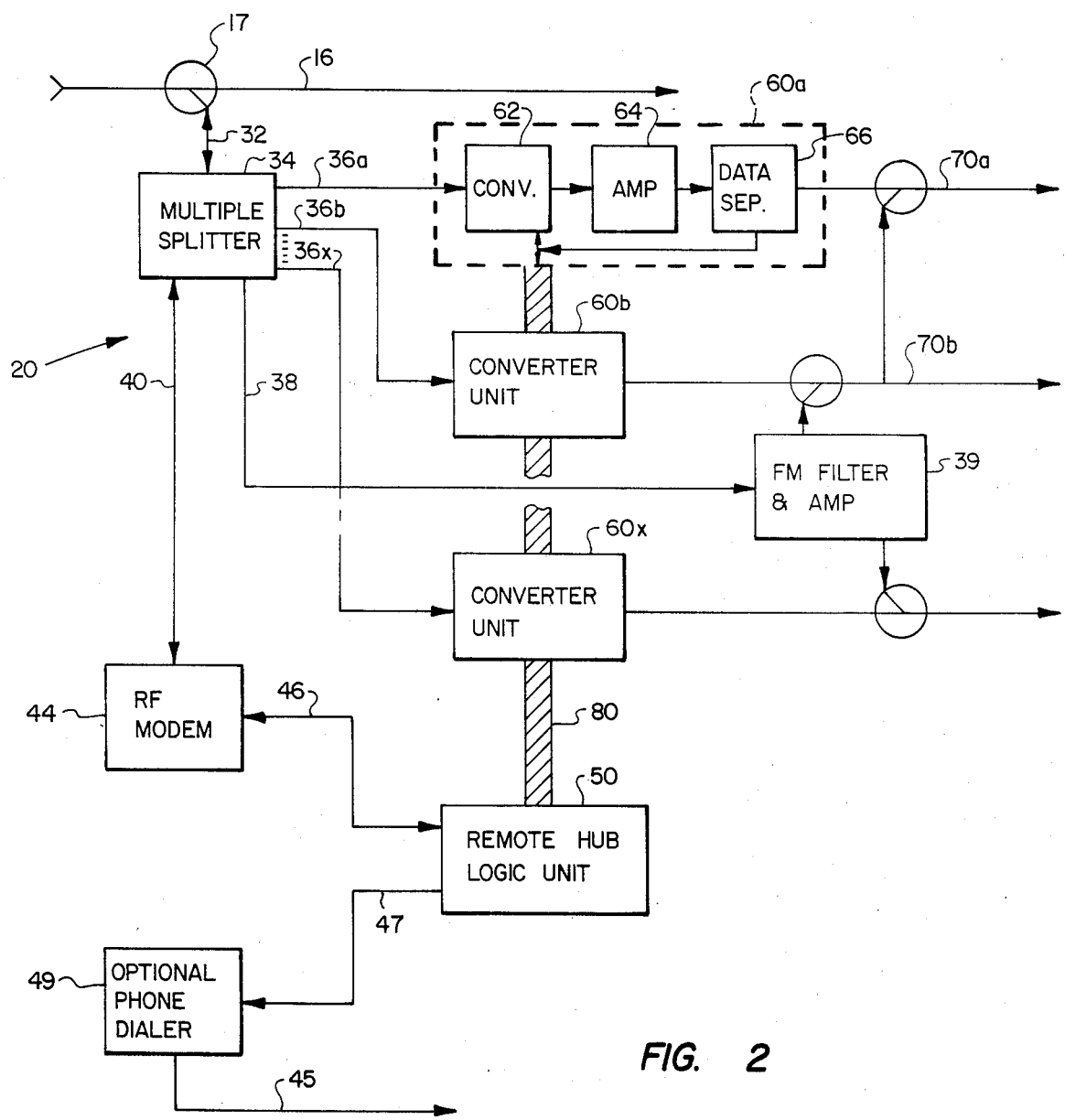
FIG. 2 is a block diagram of the remote hub station shown in FIG. 1.

Looking now at FIG. 2, remote hub station 20 is shown in greater detail. The data signals from cable drop 17 are input on line 32 to a splitter unit 34 which divides the television signals into separate parallel identical signals, one for each of the subscribers associated with the remote hub station 20. In the example shown in FIG. 2, 24 subscribers are connected to the station and thus 24 separate lines are provided with a signal being generated by splitter 34 for each of output lines 36a through 36x.

In addition, splitter 34 may include an RF amplifier providing optional FM signals for each subscriber. This FM service is preferably provided by a conventional filter and amplifier unit 39, as shown in FIG. 2.

Finally, splitter 34 includes a data output line 40 communicating with an RF transceiver modem 44. Address and control data is provided on line 40 through RF modem 44 to remote hub logic unit 50 on line 46. If the data communication system is a two-way cable system, logic unit 50 includes an output line to RF modem 44 to transmit data, including security data, upstream to the central station. Alternately, for one-way cable systems, logic unit 50 is provided with an output 47 to a telephone dialer 49 connected directly to the central station by way of a telephone line 45.

Each of the television signal lines from splitter 34 are directed to a separate converter unit. For example, line 36a feeds the television signals to a converter unit 60a, line 36b inputs to a converter unit 60b and so forth. Converter unit 60a through converter unit 60x (not shown) each output to a separate subscriber line 70a carrying a converted signal to each subscriber on a line dedicated for that particular subscriber. In addition, each of converter units 60 receive data from the subscriber relating to the tuning of the subscriber's television set and the security status of various alarm monitors at the subscriber location.

Preferably each converter unit 60 includes a conventional RF converter 62, a conventional amplifier 64 and a high/low frequency data separator unit 66 connected in series. The converter unit modifies the television signals to a single channel compatible with the subscriber's television set. Data separator 66 is a conventional high/low frequency filter, allowing the RF television signals to pass to the subscriber and separating out return low frequency data from the subscriber for transmission to remote hub logic unit 50 along a bus 80 which is common to all converter units 60. The low frequency data separated out by data separator 66 includes tuning control data from the subscriber and security data representative of the status of various alarm monitoring devices at the subscriber location. This data is provided as input to logic unit 50 to be processed together with data received from the central station on input line 46. Logic unit 50 then outputs control data for converters 60 including television control data for each subscriber and display data for the security apparatus at the subscriber station.

Multiple splitter unit 34 is preferably a conventional unit such as an 8-way splitter made by RMS Corporation in New York. Likewise RF modem unit 44 is preferably a conventional model, such as the RF Modem, model 3013A made by Tocom. If the optional telephone dialer 49 is used it is also preferably a conventional unit, such as the Digital Communicator, model No. 3014A made by Tocom. Converter units 60 are preferably conventional units, such as the Converter Card Unit, made by Times Fiber Communications for its Mini-Hub System. The data separator units are conventional unit separating the RF high frequency program signals and data signals from the low frequency control signal transmissions.

Remote hub logic unit 50 includes a converter logic section for controlling each of the converters 60 and decoding data from the central station and from data separator 66. This logic is preferably similar to the logic used in the Tocom 55 Plus Addressable Converter family, such as model No. 5504 made by Tocom, except that logic has been expanded to receive a separate input from each of converter units 60. Similarly, a security logic section of logic unit 50 is provided for processing alarm data being received from the subscriber units on common converter bus 80 and for generating data for transmission upstream to the central computer. Preferably, the security portion of said logic is similar to the alarm control logic of Tocom model 3000 home alarm terminal, except that it has been expanded to receive data from each of converters 60 on common converter bus 80. The function of both logic units is described in greater detail hereinafter.

Figure 3:
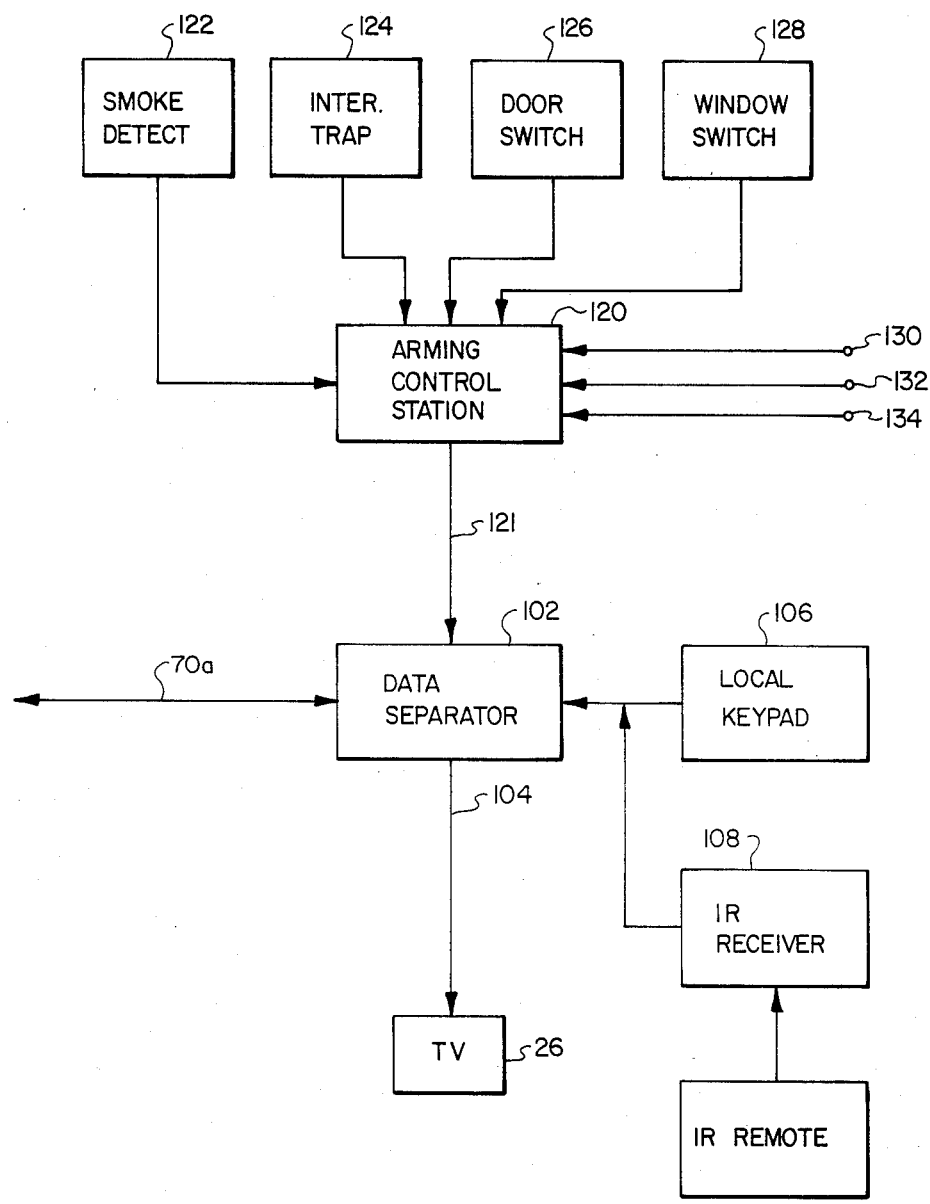
FIG. 3 is a block diagram of the subscriber adapter unit and security monitor station shown in FIG. 1.

Looking now at FIG. 3, the subscriber adapter unit 22 and the security monitor station 24 are shown in greater detail. Subscriber adapter unit 22 includes a high/low frequency data separator 102 connected to line 70a from converter 60a in FIG. 2. Separator 102 also connects to the subscriber's television set on line 104 and the security monitor station 24. Optionally, separator 102 may also receive input from a local keyboard unit 106 or an IR receiver 108.

Security monitor station 24 includes an arming control station 120 having a plurality of alarm buttons and alarm inputs from various types of detectors. As shown on FIG. 3, arming control station 120 preferably receives an alarm input signal from a smoke detector unit 122, an internal trap unit 124, a door switch 126 and window switches 128. In addition, personally-activated buttons such as fire button 130, police button 132 and medical button 134 provide alarm input signals to arming control station 120.

Arming control station 120 is preferably a conventional unit such as Tocom Arming Control Station, model No. 3010A, having emergency keys thereon and LED indicators concerning the status of each monitor. Preferaby, arming control station 120 also includes a digital key pad for inputting a subscriber code changing the mode of monitoring operation. For example, the subscriber may want to activate the internal trap, as well as door and window switches, to monitor the possibility of intrusion only while absent from his residence. The signals directed to arming control station 120 may be either analog or digital in nature. Station 120 modifies the signals to be directed on line 121 as low-frequency digital signals, such as DC-modulated signals, for transmission by data separator 102 upstream on line 70a to converter 60a. Alternately the security signals may be sent in other modes, such as RF or FSK. Since the downstream television signals are transmitted at a relatively high RF frequency on the same line 70a, there is no interference with the low frequency upstream data signals.

In operation, arming control station 120 provides security signal inputs to the security portion of remote hub logic unit 50. Unit 50 is effectively armed by the subscriber station by processing these alarm signal inputs in view of status codes previously provided to the logic unit by the subscriber. For example, preferably, signals from internal trap 124, door switch 126 and window switches 128 are ignored by logic unit 50 until the subscriber inputs a code on the keypad of arming control station 120 indicating that intrusion is to be monitored. On the other hand, logic unit 50 is preferably programmed to continually monitor and generate security data from smoke detector 122 and from emergency buttons 130, 132 and 134, since the importance of these alarm inputs is normally not contingent upon whether the subscriber is at home. Moreover, logic unit 50 may be programmed to provide for various levels of encoding from the subscriber so that the arming control station may be accessed at different times by different individuals. The subscriber master code preferably has access to arm and disarm the remote hub logic unit 50 through arming control station 120 at all times.

As can be seen from the foregoing, the present invention provides a data communication system which minimizes the apparatus located at each remote user station. Nearly all of the processing logic for arming and disarming the security system at the subscriber station is located at a remote hub facility to which access can be carefullly controlled. Likewise, in a data communication system including television programming, essentially all conversion and control functions are also carried out at the remote hub location. The subscriber station only requires apparatus for monitoring the security status of various alarm devices and for transmitting tuning data for the television signals being received by the subscriber. This arrangement provides a substantial advantage in reduced cost for the subscriber because a complete television converter unit and home security terminal are not needed at each location. Moreover, this arrangement is advantageous to the cable television operator by reducing the possibility of the subscriber tampering with the television conversion and security units.

Figure 4:
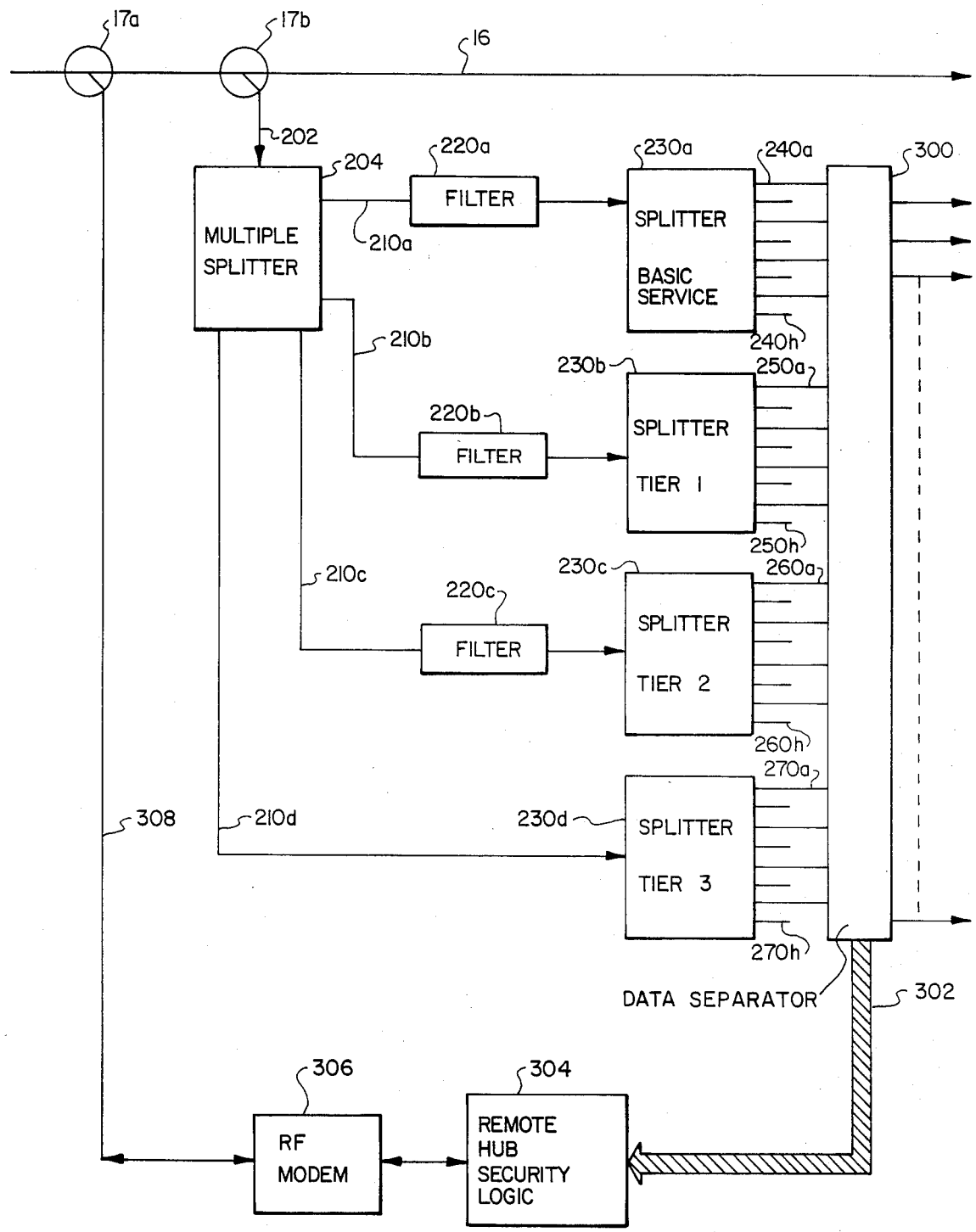
FIG. 4 is a block diagram of an alternate preferred embodiment of the remote hub station shown in FIG. 1.

Referring now to FIG. 4, an alternate preferred embodiment of remote hub station 20 is disclosed which does not utilize the remote converter concept shown in FIG. 2. In FIG. 4 control with regard to level of television programming service provided for each user location is hard-wire connected by a plurality of splitter units, each generating a television signal to a user authorized for a level of service. If necessary, the conversion function of adapting the signal to a frequency compatible with the user's receiver is carried out at each user location. In the embodiment of FIG. 4, the security portion of remote hub station 20 functions as a stand-alone unit having its own independent logic and receiving its data input directly from the lines connecting each user station to the remote hub station.

More specifically, in FIG. 4 the television signal from cable drop 17b is input by line 202 to a multiple splitter unit 204. In this embodiment, the television signal on line 202 is split into a plurality of signals on a plurality of output lines 210a–210d, each line corresponding to a different level of service provided to the subscribers. Output line 210a is directed through a frequency filter 220a to a splitter unit 230a having separate line outputs 240a–240h for each user receiving service from splitter 230a. Filter 220a passes only those frequencies to which the users are entitled for basic service by way of splitter 230a.

Similarly, output line 210b provides a television signal to filter 220b which filters out frequencies not authorized for users receiving level one service. The output from filter to 220b is fed to splitter unit 230b which provides output on lines 250a through 250h for reception by the user stations.

In a similar manner, filter 220c restricts television programming service to splitter 230c to a level two service. Splitter 230c outputs that television program service on lines 260a–260h to the subscribers. Finally, line 210d feeds directly to splitter 230d without need for a filter since users receiving service on lines 270a–270h are entitled to the full service level without restriction.

A data separator strip 300 is provided which is attached to each of the user inputs 240a–270h to filter out and remove low frequency security-type data being transmitted upstream from each user station. This data separator strip is substantially identical to the data separator 102 of FIG. 3 and the data separator unit 66 of FIG. 2. As in those cases, data separator strip 300 is a high/low frequency filter which removes security data coming from the user stations. This low frequency data is transmitted on a security bus 302 to remote hub security logic unit 304 which processes the security data and arms the subscriber station as previously discussed. An RF modem unit 306 is preferably provided to receive and transmit data to and from the central station with regard to security control of each user station. Preferably security logic unit 304 and RF modem 306 are conventional units both in a single box, such as the Tocom 3000 home alarm terminal mentioned earlier. Separate logic for controlling remote converters are not needed because of the absence of such converters in this system.

The stand-alone security system for remote hub operation shown in FIG. 4 may be used with the same subscriber adapter unit 22 and security monitor station 24 shown in FIG. 3. The only difference in the subscriber adapter unit 22 used with the remote hub system of FIG. 4 is that a conventional television converter may be required to interface between the data separator 102 of FIG. 3 and the television receiver 26, shown in FIG. 1. This conventional TV converter may not be needed with later model television receivers already adapted for cable operation.

The operation of the preferred embodiment of the invention according to FIGS. 1-3 will now be described. The system operation is controlled primarily by the remote hub logic unit 50 in FIG. 2. This unit contains a combination of program access logic for controlling the television program viewed by the user and security logic for monitoring and controlling the security devices at the user location. The television program access functions will be described first, followed by a discussion of the security related functions of this system. It should be understood that the following descriptions of these two functions represent only one preferred embodiment of the logic of the present invention. Moreover, although the television programming control functions described herein does not comprise the invention by itself, one embodiment of that function is described herein to provide a complete disclosure of the system in which the invention is utilized.

Preferably, the television programming control aspect of the present invention is a one-way television system similar to a system utilizing Tocom 55 Plus converters. This system authorizes users for a particular television channel, a particular television program, or a particular level or tier of television programming without requiring two-way upstream data communication. Access to the programming is also conrolled based on the type of subject matter, for example "adult-rated" programming or special interest programming.

Access to the television programming is preferably controlled entirely by the central station. Certain authorization codes are transmitted periodically to each user station identifying the level of service and type of programming to which the user is entitled. Subsequent codes are transmitted with each television program which are compared by the converters at the remote hub station with the previously transmitted subscriber codes to determine authorization for the transmitted program.

This type of system is referred to as a "program access criterion" system, in that each program control signal identifies certain criterion which must be met by the user stations in order to have access to the program, without specifically identifying each user or subscriber station by number. This approach is preferable over a "subscriber identification access criterion" system in which the control data sent with each television program identifies specifically each subscriber who is entitled to view the program. In contrast, a program access criterion system such as that preferably used with the present invention provides each subscriber converter unit with certain codes identifying categories which must match with subsequent codes for each program in order to authorize the user to receive the program.

In this preferred type of system, any number of different types of data formats may be used. The control and addressing data as well as the various category codes can be transmitted on the vertical interval of the television signals from the central computer to the addressable converter. Preferably, the subscriber identification information is sent on a separate dedicated channel or as a separate data transmission at a low priority time. The data format or mode of transmission is not important to the present invention.

The information sent with regard to authorization for each subscriber is referred to as the subscriber addressing data and includes four code words, namely a channel enable word, a tier enable word, a program enable word and a eligibility or parental access word. A special access key number is also transmitted to the subscriber. These words all contain codes for controlling access of the user to the cable television system. The codes are normally originated by the subscriber at the time he begins the service by a payment of certain subscription fees. The codes may preferably be altered periodically by the system operator at the request of the subscriber.

After the subscriber addressing data has been transmitted to the converter logic 50 at the remote hub station, each converter 60 is appropriately programmed for selective reception of the subsequently transmitted television programs. Each program transmitted includes a program control word having several codes therein for comparison with the subscriber words. These codes include a tier code, a program code and an eligibility or parental access code. Each converter 60 compares the subscriber codes in the previously mentioned subscriber words to each of the codes in the program control word. Only when a match is made for these codes is the user authorized to receive the program in question.

Figure 5:
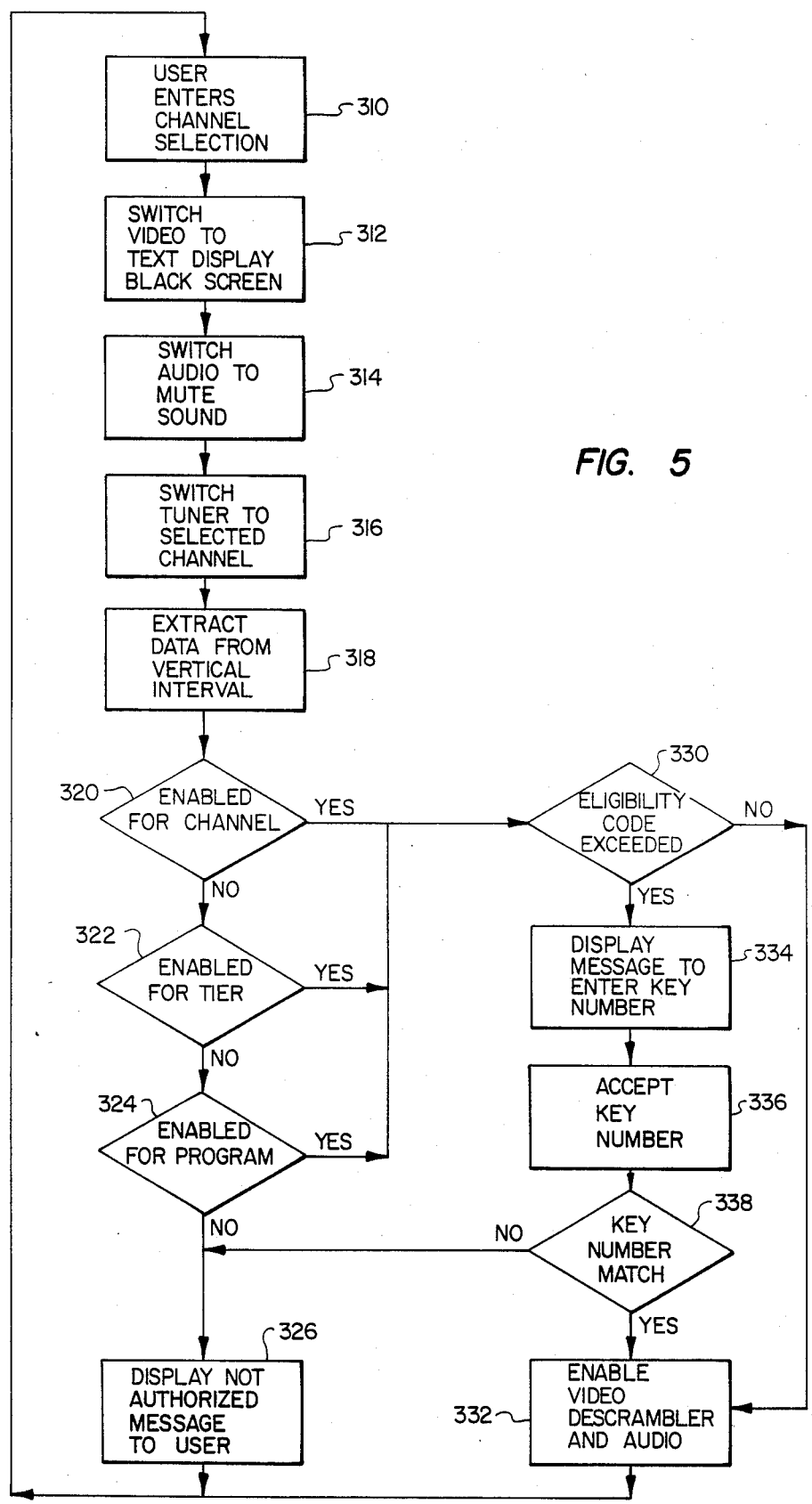
FIG. 5 is a logic flow diagram of the operation of the television program control portion of the system of the present invention.

Referring now to FIG. 5, a flow diagram is shown describing the operation of a converter unit 60 under control of remote hub logic unit 50 in selecting a given channel and determining access to a given program. The process begins at step 310 with the user entering a new channel number on the local keypad 106. At that point, the converter control logic 50 implements several preparatory steps in the converter. The appropriate video switches in converter 60 switch to a text display mode which in turn provides a black screen output to the television set. Converter control logic 50 also mutes the audio output to the television set and retunes to the requested channel.

Logic 50 then separates out the data transmitted on the vertical interval of the selected television signal by conventional means and makes several comparisons between the subscriber addressing data which describes the converter authorization and the channel control word which describes the required authorization for the television program currently being transmitted on the selected channel. As shown at decision step 320 of FIG. 5, a determination is made as to whether the subscriber is enabled for the selected channel. This is done by comparing the channel enable code identifying the subscriber with the selected channel number. If there is no correspondence between these two codes, the next decision step 322 is taken in which it is determined whether the subscriber is enabled for the tier or level of service of the television program in question. This is determined by comparing the tier enable code of subscriber to the tier code of tuned television program. If the compared words do not correspond, the process moves to the next decision step 324 in which a determination is made as to whether the subscriber is enabled for the television program in question with regard to the current time slot. This determination is required only if there is transmission of a special event for which an additional access clearance is needed.

If the answer is no to each of decision steps 320, 322 and 324, then the user station is not enabled for reception of the television program being broadcast on the selected channel. In that event, step 326 is taken in which the logic 50 generates an appropriate message for display on the television screen of the user indicating that the user station is not authorized for reception of the program currently being broadcast on a selected channel. The converter control logic 50 then cycles back to step 310 where it waits for the user to enter a new channel number.

In the event that a yes answer is received for any of the three decision steps 320, 322 and 324, converter control logic 50 proceeds with a further decision step 330. A determination is made as to whether the eligibility code threshold for the user station is exceeded by the eligibility code of the program currently on the channel number selected. This is done by comparing the eligibility code threshold of the eligibility word for the user to the eligibility code of the tuned television program. If the threshold is not exceeded, then the converter 60 is enabled for processing of the television signal. As shown at step 332, the video descrambler (not shown) of logic 50 is enabled to process the video signal of the selected television program and the audio mute control (not shown) of logic 50 is enabled to transmit the audio signal to the television set.

In the event that the eligibility code threshold is exceeded, converter control logic 50 takes the next step 334 which is to generate an appropriate message for display on the television set of the user. The message instructs the user to enter his confidential key number on the converter keyboard 139 in order to enable viewing of the program in question. The entered number is then compared with the subscriber's key number as given in the eligibility word of the subscriber, indicated at decision step 338. If the key number matches with the entered number, the converter control logic 50 proceeds to the enabling step 332 as previously mentioned. If the entered number does not match with the subscriber's key number, the converter control proceeds to step 326 in which the user is informed that he is not authorized for reception of the program in question.

The foregoing procedure describes the process that logic 50 and converters 60 use for authorization to process a program received on a selected channel. Similar procedures are followed in performing a broad spectrum of functions involving one-way and two-way interactive television and data transmission. These operations are not described herein because they are not a part of the present invention.

Figure 6:
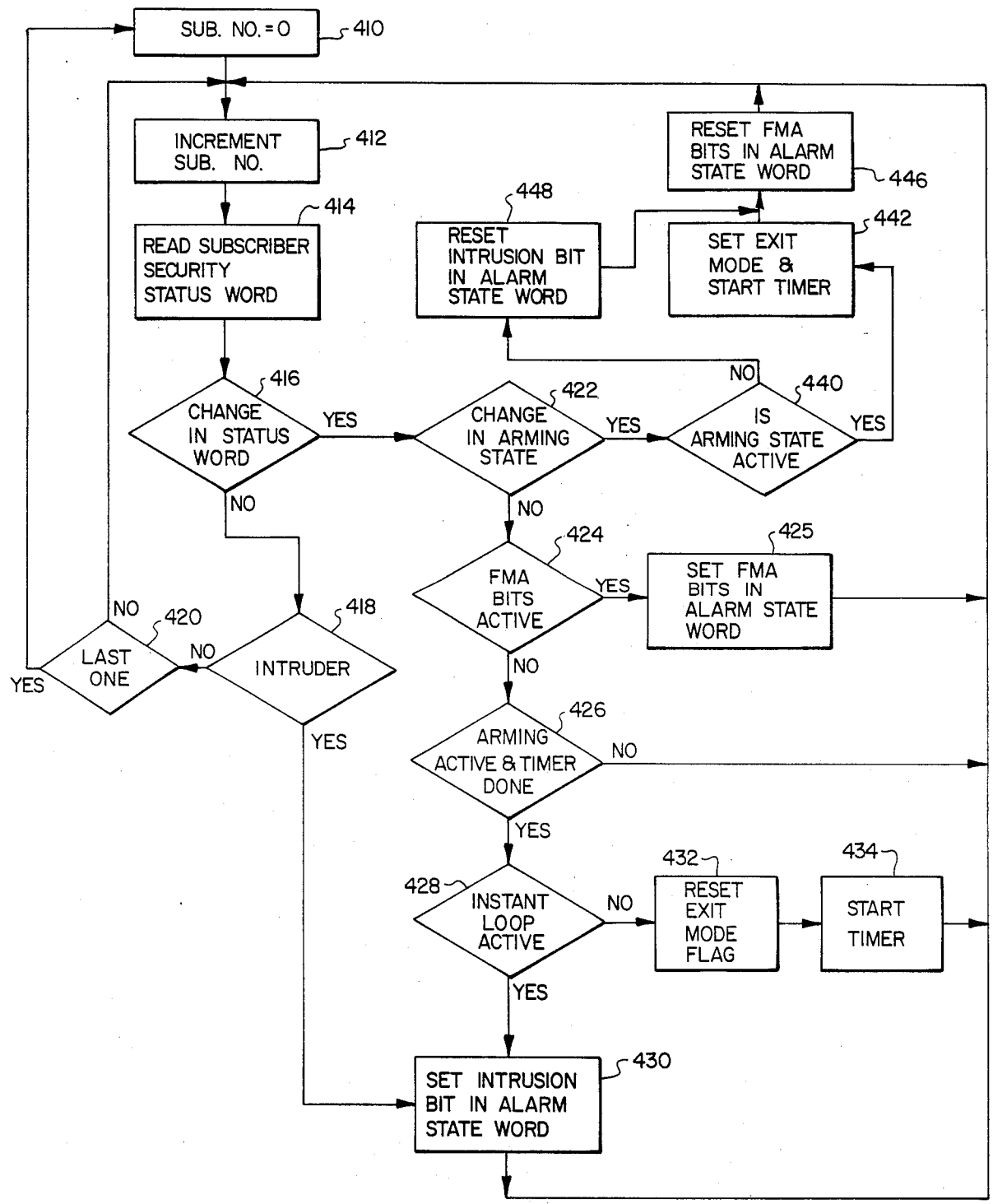
FIG. 6 is a logic flow diagram of the operation of the security control portion of the system of the present invention.

In FIG. 6 a flow diagram is shown which describes the operation of that portion of the remote hub logic unit 50 which monitors and controls the security-related functions of the system. The security activities involve the upstream flow of data from the subscriber station to the remote hub station providing the status of each security monitoring device and "arming" data from the subscriber with regard to those devices. This information is transmitted periodically to the remote hub logic from arming control station 120 in the form of a "security status word" for each subscriber, preferably having an 8-bit code. In the preferred embodiment, separate bits in the code are assigned for alarm conditions with regard to fire, medical, assault, entry/exit loop, instant loop and arming state. The generation of the security status word is described hereinafter.

The security functions of the system of the present invention also preferably include the processing of data from the remote hub logic 50 to the central station. This is done by means of another 8-bit word generated by remote hub logic 50 referred to as an "alarm state word" describing the status of each subscriber. Included in that word are separate bits for fire, medical, assault and intrusion. Security information is transmitted to the central station by changing each of the bits in the alarm state word in accordance with the information relayed to the remote hub station by way of the security status word. The central station sequentially polls each of the remote hub stations for the current alarm state word for each subscriber.

Referring to the security status word, the fire bit becomes active, that is it switches from a 0 to a 1, when a positive input is received from either smoke detector 122 or emergency fire button 130 shown in FIG. 3. Similarly, the medical bit becomes active if emergency medical button 134 is activated, and the assault bit is active if the emergency police button 132 shown in FIG. 3 is activated. In each such situation, the corresponding fire, medical or assault bit is changed to active status in the alarm state word being transmitted to the central station.

The entry/exit loop bit in the security status word indicates to the remote hub logic whether a normal entryway, such as a door, at the monitored location has been opened. This bit is generated by arming station 120 in response to an alarm signal from door switch 126 shown in FIG. 3. The instant loop bit of the security status word indicates to the logic whether an entryway has been opened which is not normally opened, such as a window. This signal is generated by arming station 120 in response to an alarm signal from window switch 128 in FIG. 3. These two bits are normally ignored by the logic unless the arming state bit in the security status word is active. This bit is activated by the subscriber at the user location entering his arming code in the keypad of the arming control station 120.

Remote hub logic unit 50 preferably includes a sixty second timer unit for each subscriber being monitored. The timer provides a delay time for the user to disarm the security logic after breaking the entry/exit loop by making an entry into an armed location or by arming the location prior to leaving. Disarming is normally carried out by the subscriber entering on the keypad of the arming control station 120 an appropriate code identifying him for authorized entry before the time delay period expires. Similarly authorized arming of the premises is completed after the arming code is generated by closing the entryways before the time delay period expires. A separate exit mode flag bit is maintained in logic 50 for each subscriber to indicate whether the timer is being used for the exit mode or the entry mode for the monitored premises. Both the sixty second timer and the exit mode flag will be referred to in the subsequent discussion of the security logic.

Referring now to FIG. 6, a more detailed discussion is provided concerning the security functions. The process begins at step 410 wherein logic unit 50 sets the subscriber number at 0. The number is then incremented by one at step 412 as a beginning point in the continuing loop of processing security data for each subscriber associated with the remote hub. At step 414, the security status word for the current subscriber is read by the logic and compared, at step 416, with the security status word previously stored from the last time that particular subscriber was addressed by the logic. If the status word is the same, a determination is made at decision block 418 as to whether there has been an intrusion. This is done by determining whether there exists a combination of three situations, namely the arming state is active, the exit mode has been reset (indicating entry) and the sixty second time delay period has ended. If these situations all exist, an unauthorized intrusion has occurred and the intrusion bit is set in the alarm state word.

If an intrusion has not occurred, the logic makes a determination, at step 420, as to whether this is the last subscriber. If not, the subscriber number is incremented by one and the process is repeated. If this is the last subscriber, the subscriber number is set to zero and the entire process is repeated.

Going back to decision block 416, if the status word of the current subscriber is not the same as the previously stored status word, then a number of tests are conducted to determine what has changed so that the alarm status word being sent to the central station can be revised. A determination is first made at decision block 422 as to whether the arming state has been modified. If not, then at decision block 424 a similar determination is made with regard to the fire, medical and assault bits, if they have not been previously active. If one of those bits is active the corresponding bit in the alarm state word is set, at step 425, and the logic is incremented to the next subscriber at step 412.

If the answer to that inquiry is no, then decision block 426 determines whether the arming state is active and the sixty second timer is complete. If not, there is an exit delay period underway or a disabled intrusion, and the logic cycles to the next subscriber at step 412.

If the arming state is active and the sixty second timer is complete, a further test is made at step 428 to determine whether the instant loop bit is active. If so, this indicates that an entryway not normally used has been opened. Thus, a time delay is not needed and the intrusion bit in the alarm state word is immediately set, at step 430. The logic then reverts to the next subscriber at step 412. If the instant loop is not active, the logic assumes that the subscriber is in the entry mode. The exit mode flag is reset to zero, at step 432, and the sixty second timer is started at step 434. The logic then goes to the next subscriber at step 412.

Going back to decision block 422, if the arming state of the security status word is different from the last test, a decision is made at step 440 to determine whether the arming state is now active. If the answer is yes, the subscriber is in the process of exiting the monitored location. The exit mode flag is set and the sixty second delay timer is started for the subscriber at step 442. The fire, medical and assault bits in the alarm state word are also reset at step 446, and the logic proceeds to the next subscriber at step 412.

If the arming state is determined to be inactive at decision block 440, the intrusion bit is reset in the alarm state word of the current subscriber at step 448. The fire, medical and assault bits are also reset at step 446 and the process moves on to the next subscriber at step 412.

Although the foregoing description has disclosed preferred embodiments of the present invention, it should be understood that other obvious modifications fall within the scope of the present invention. For example, a plurality of fiber optic lines or other types of dedicated line transmission may be substituted for the coaxial cable embodiments shown herein, provided that the data communication link between the remote hub station and the subscriber location comprises a dedicated communication link for each subscriber carrying data between the subscriber and a remote hub station which processes the data, including television and security data. Likewise, it would be obvious to modify the remote hub station to include or not include FM radio service and to provide return data to the central station using either telephone lines or cable transmission, as shown. It is also obviously within the scope of the present invention to utilize different frequencies or modes of transmission of the television data and security data provided that they are transmitted on a common data link in formats sufficiently different to avoid interference with each other.

In the event that the data communication link between the remote hub station and its plurality of subscriber stations is a bundle of fiber optic lines rather than a coaxial cable, the preferable approach is to use at least one fiber optic line for transmitting downstream television data to the remote user stations and at least one separate fiber optic line for transmitting upstream security data to the remote hub logic unit 50. In such case, data separator unit 66 shown in FIG. 2 preferably comprises an optical modulator and an optical demodulator. A conventional fiber optic modulator unit modulates the downstream signals on one fiber line at an optical frequency, and a separate fiber optic demodulator on a separate upstream fiber optic line demodulates security data at an optical frequency for processing by logic unit 50. Data separator 102 in FIG. 3 likewise comprises a corresponding set of a fiber optic demodulator on a downstream fiber optic line which outputs to the user's television receiver and a fiber optic modulator on a separate upstream fiber optic line feeding from arming control station 120 and local keypad 106 to the remote hub station.

The scope of the present invention further includes the transmission of a television signal from a remote hub station 20 to each remote subscriber station 22 without RF modulation at the remote hub station. In such case, the television signals are tuned at the remote hub station and transmitted to the user at baseband frequencies. RF modulation is carried out at the user station.

A further modification of the method for transmitting the television signals which falls within the scope of the present invention is the utilization of a conventional crosspoint switching technique at each remote hub station to minimize the number of converters required. This approach employs a grid of converter output lines overlaid by subscriber input lines such that each subscriber is enabled to switch from one converter to another at due remote hub. The remote hub logic unit assigns the converters to tune to selected television stations as required by subscriber selections. This approach has the advantage of minimizing the number of converters used for a given number of subscribers, so that a single converter is not required for each subscriber communicating with a remote hub station.

Any of the foregoing modified embodiments could be intermixed within the scope of the present invention. For example, the use of baseband transmission coupled with fiber optic modulation might be utilized between the remote hub station and the subscriber user stations within the scope of the present invention. Likewise the crosspoint conversion approach might be coupled with baseband transmission or fiber optic modulation and demodulation.

It is further understood that the present invention includes various additional changes and modifications which are obvious to those skilled in the art without departing from the spirit of the invention. It is, therefore, contemplated that the appended claims include all such modifications or embodiments falling within the spirit and scope of the invention.

What is claimed is:

1. In a data communication system in which data, including television signals, are transmitted from a central station to a plurality of remote user stations at different levels of service, and data including security information are transmitted from the remote user stations to the central station, the combination comprising:
(a) a remote hub processing station in communication with and located remote from the central station and the plurality of user stations, having:
   (1) first splitter means for splitting the television signals transmitted by the central station into a plurality of television signals, one for each level of service provided to the remote user stations,
   (2) a plurality of second splitter means in communication with said first splitter means, each second splitter means receiving a portion of one of said plurality of television signals and splitting said one signal into a plurality of user television signals for said remote user stations,
   (3) a plurality of filter means, each filter means receiving one of said plurality of television signals and transmitting to one of said second splitter means said portion of one of the television signals representative of one level of service provided to the plurality of user stations,
   (4) a plurality of data communication links, each extending from one of said second splitter means to one of the remote user stations,
   (5) security data separator means connected to each of said plurality of data communication links for receiving security signals from said remote user stations and transmitting the security signals on a common security bus,
   (6) security logic means in communication with said security bus for generating security data representative of the security signals from the remote user stations, and
   (7) transmitter means in communication with said security logic means for transmitting the security data to the central station, and
(b) a plurality of adapter means in communication with said remote hub processing station, each adapter means being located at one of said remote user stations, and having:
   (1) frequency separator means in communication with one of said data communication links for receiving the user television signals from one of said second splitter means and for transmitting the security signals to said security data separator means,
   (2) a plurality of security monitoring devices, each having an alarm means for selectively generating an alarm signal representative of the status of the security monitoring device,
   (3) security arming means connected to each of said security monitoring devices for receiving said alarm signals and generating the security signals representative of the status of the security monitoring devices to the frequency separator means.

2. The system of claim 1 wherein the television signals are transmitted to the frequency separator on the data communication link at a radio frequency, and the security signals are transmitted to the security data separator means on said data communication link at a frequency substantially different from the frequency of the television signals.

3. The system of claim 1 wherein the data communication link is a coaxial cable.

4. The system of claim 1 wherein the data communication link is a fiber optic cable.

5. The system of claim 1 wherein said security data separator means is a low frequency filter type for passing the radio frequency television signals from the plurality of second splitter means and removing the low frequency security signals from the remote user stations for transmission on the security bus.

* * * * *